United States Patent
Moreau et al.

(10) Patent No.: US 8,416,952 B1
(45) Date of Patent: Apr. 9, 2013

(54) CHANNEL FAMILY SURF CONTROL

(75) Inventors: Samuel Moreau, Mill Valley, CA (US);
Don Ahrnes, Mill Valley, CA (US);
Georgia Gibbs, Mill Valley, CA (US);
John Carney, Corte Madera, CA (US);
David de Andrade, San Anselmo, CA (US)

(73) Assignee: Tvworks, LLC, Philadelphia, PA (US)

( * ) Notice: Subject to any disclaimer, the term of this patent is extended or adjusted under 35 U.S.C. 154(b) by 885 days.

(21) Appl. No.: 10/894,740

(22) Filed: Jul. 19, 2004

Related U.S. Application Data

(63) Continuation-in-part of application No. 10/672,983, filed on Sep. 25, 2003.

(60) Provisional application No. 60/488,560, filed on Jul. 18, 2003, provisional application No. 60/486,568, filed on Jul. 11, 2003.

(51) Int. Cl.
*H04N 21/45* (2011.01)
*H04N 21/47* (2011.01)

(52) U.S. Cl.
USPC ................................. 380/211; 725/45; 725/52

(58) Field of Classification Search .............. 725/45–46, 725/51–53, 56–58, 61; 455/515, 518–519
See application file for complete search history.

(56) References Cited

U.S. PATENT DOCUMENTS

| | | | |
|---|---|---|---|
| 5,287,489 A | 2/1994 | Nimmo et al. | |
| 5,321,750 A | 6/1994 | Nadan | |
| 5,485,221 A | 1/1996 | Banker et al. | |
| 5,583,563 A | 12/1996 | Wanderscheid et al. | |
| 5,589,892 A | 12/1996 | Knee et al. | |
| 5,592,551 A | 1/1997 | Lett et al. | |
| 5,594,509 A | 1/1997 | Florin et al. | |
| 5,613,057 A | 3/1997 | Caravel | |
| 5,657,072 A | 8/1997 | Aristides et al. | |

(Continued)

FOREIGN PATENT DOCUMENTS

| | | |
|---|---|---|
| EP | 0624039 | 4/1994 |
| EP | 0624039 | 11/1994 |

(Continued)

OTHER PUBLICATIONS

Sylvain Devillers, Bitstream Syntax Definition Language: an input to MPEG-21 Content Representation, Mar. 2001, ISO, ISO/IEC JTC1/SC29/WG11 MPEG01/M7053).

(Continued)

*Primary Examiner* — Minh Dinh
*Assistant Examiner* — Venkat Perungavoor
(74) *Attorney, Agent, or Firm* — Banner & Witcoff, Ltd.

(57) ABSTRACT

An interface for an interactive television application includes a graphical representation of a channel changing apparatus and is configured such that in response to a channel change request a channel change event limited to a channel change within a designated family of television channels is initiated. The graphical element may be labeled so as to indicate the presently viewed family of television channels. In various embodiment, the channel content may be scaled to fit within a window or may be full screen, in which latter case the interface may be overlaid on top of the full screen video. In one example, the graphical representation of the channel changing apparatus resembles a pair of channel up/down buttons.

21 Claims, 4 Drawing Sheets

U.S. PATENT DOCUMENTS

| | | | |
|---|---|---|---|
| 5,659,793 A | 8/1997 | Escobar et al. | |
| 5,666,645 A | 9/1997 | Thomas et al. | |
| 5,675,752 A | 10/1997 | Scott et al. | |
| 5,694,176 A * | 12/1997 | Bruette et al. | 725/43 |
| 5,826,102 A | 10/1998 | Escobar et al. | |
| 5,844,620 A | 12/1998 | Coleman et al. | |
| 5,850,218 A | 12/1998 | LaJoie et al. | |
| 5,852,435 A | 12/1998 | Vigneaux et al. | |
| 5,860,073 A | 1/1999 | Ferrel et al. | |
| 5,883,677 A | 3/1999 | Hofmann | |
| 5,892,902 A | 4/1999 | Clark | |
| 5,892,905 A | 4/1999 | Brandt et al. | |
| 5,929,849 A | 7/1999 | Kikinis | |
| 5,990,890 A | 11/1999 | Etheredge | |
| 5,996,025 A | 11/1999 | Day et al. | |
| 6,002,394 A | 12/1999 | Schein et al. | |
| 6,005,561 A | 12/1999 | Hawkins et al. | |
| 6,008,803 A * | 12/1999 | Rowe et al. | 715/721 |
| 6,008,836 A | 12/1999 | Bruck et al. | |
| 6,016,144 A | 1/2000 | Blonstein et al. | |
| 6,025,837 A | 2/2000 | Matthews, III et al. | |
| 6,049,823 A | 4/2000 | Hwang | |
| 6,067,108 A | 5/2000 | Yokote et al. | |
| 6,088,722 A | 7/2000 | Herz et al. | |
| 6,094,237 A | 7/2000 | Hashimoto | |
| 6,141,003 A | 10/2000 | Chor et al. | |
| 6,148,081 A | 11/2000 | Szymanski et al. | |
| 6,162,697 A | 12/2000 | Singh et al. | |
| 6,169,543 B1 * | 1/2001 | Wehmeyer | 725/47 |
| 6,172,677 B1 | 1/2001 | Stautner et al. | |
| 6,177,931 B1 | 1/2001 | Alexander et al. | |
| 6,191,781 B1 * | 2/2001 | Chaney et al. | 725/45 |
| 6,205,582 B1 | 3/2001 | Hoarty | |
| 6,219,839 B1 | 4/2001 | Sampsell | |
| 6,240,555 B1 | 5/2001 | Shoff et al. | |
| 6,292,827 B1 | 9/2001 | Raz | |
| 6,314,569 B1 | 11/2001 | Chernock et al. | |
| 6,317,885 B1 | 11/2001 | Fries | |
| 6,345,305 B1 | 2/2002 | Beck et al. | |
| 6,405,239 B1 | 6/2002 | Addington et al. | |
| 6,415,438 B1 | 7/2002 | Blackketter et al. | |
| 6,421,067 B1 * | 7/2002 | Kamen et al. | 715/719 |
| 6,426,779 B1 * | 7/2002 | Noguchi et al. | 348/569 |
| 6,442,755 B1 | 8/2002 | Lemmons et al. | |
| 6,477,705 B1 | 11/2002 | Yuen et al. | |
| 6,486,920 B2 * | 11/2002 | Arai et al. | 348/563 |
| 6,522,342 B1 | 2/2003 | Gagnon et al. | |
| 6,529,950 B1 | 3/2003 | Lumelsky et al. | |
| 6,532,589 B1 | 3/2003 | Proehl et al. | |
| 6,564,263 B1 | 5/2003 | Bergman et al. | |
| 6,567,104 B1 | 5/2003 | Andrew et al. | |
| 6,571,392 B1 | 5/2003 | Zigmond et al. | |
| 6,591,292 B1 * | 7/2003 | Morrison et al. | 709/206 |
| 6,621,509 B1 | 9/2003 | Eiref et al. | |
| 6,678,891 B1 | 1/2004 | Wilcox et al. | |
| 6,684,400 B1 * | 1/2004 | Goode et al. | 725/61 |
| 6,760,043 B2 | 7/2004 | Markel | |
| 6,763,522 B1 | 7/2004 | Kondo et al. | |
| 6,766,526 B1 | 7/2004 | Ellis | |
| 6,806,887 B2 | 10/2004 | Chernock et al. | |
| 6,910,191 B2 | 6/2005 | Segerberg et al. | |
| 7,028,327 B1 | 4/2006 | Dougherty et al. | |
| 7,065,785 B1 * | 6/2006 | Shaffer et al. | 726/17 |
| 7,103,904 B1 | 9/2006 | Blackketter et al. | |
| 7,114,170 B2 | 9/2006 | Harris et al. | |
| 7,152,236 B1 * | 12/2006 | Wugofski et al. | 725/40 |
| 7,162,694 B2 | 1/2007 | Venolia | |
| 7,162,697 B2 | 1/2007 | Markel | |
| 7,197,715 B1 | 3/2007 | Valeria | |
| 7,207,057 B1 | 4/2007 | Rowe | |
| 7,213,005 B2 | 5/2007 | Mourad et al. | |
| 7,221,801 B2 | 5/2007 | Jang et al. | |
| 7,305,696 B2 | 12/2007 | Thomas et al. | |
| 7,337,457 B2 | 2/2008 | Pack et al. | |
| 7,360,232 B2 | 4/2008 | Mitchell | |
| 7,363,612 B2 | 4/2008 | Satuloori et al. | |
| 7,440,967 B2 | 10/2008 | Chidlovskii et al. | |
| 7,464,344 B1 | 12/2008 | Carmichael et al. | |
| 7,516,468 B1 | 4/2009 | Deller et al. | |
| 7,587,415 B2 | 9/2009 | Gaurav et al. | |
| 7,640,487 B2 | 12/2009 | Amielh-Caprioglio et al. | |
| 7,703,116 B1 | 4/2010 | Moreau et al. | |
| 7,721,307 B2 | 5/2010 | Hendricks et al. | |
| 7,743,330 B1 | 6/2010 | Hendricks et al. | |
| 7,958,528 B2 | 6/2011 | Moreau et al. | |
| 2001/0014206 A1 | 8/2001 | Artigalas et al. | |
| 2001/0027563 A1 | 10/2001 | White et al. | |
| 2001/0056573 A1 | 12/2001 | Kovac et al. | |
| 2001/0056577 A1 * | 12/2001 | Gordon et al. | 725/52 |
| 2002/0010928 A1 | 1/2002 | Sahota | |
| 2002/0016969 A1 | 2/2002 | Kimble | |
| 2002/0023270 A1 | 2/2002 | Thomas et al. | |
| 2002/0041104 A1 | 4/2002 | Graf et al. | |
| 2002/0042915 A1 | 4/2002 | Kubischta et al. | |
| 2002/0059094 A1 | 5/2002 | Hosea et al. | |
| 2002/0059586 A1 | 5/2002 | Carney et al. | |
| 2002/0059629 A1 | 5/2002 | Markel | |
| 2002/0078444 A1 | 6/2002 | Krewin et al. | |
| 2002/0083450 A1 * | 6/2002 | Kamen et al. | 725/45 |
| 2002/0100041 A1 | 7/2002 | Rosenberg et al. | |
| 2002/0108122 A1 | 8/2002 | Alao et al. | |
| 2002/0124254 A1 * | 9/2002 | Kikinis | 725/34 |
| 2002/0144269 A1 | 10/2002 | Connelly | |
| 2002/0144273 A1 | 10/2002 | Reto | |
| 2002/0147645 A1 | 10/2002 | Alao et al. | |
| 2002/0152477 A1 | 10/2002 | Goodman et al. | |
| 2002/0156839 A1 | 10/2002 | Peterson et al. | |
| 2002/0169885 A1 | 11/2002 | Alao et al. | |
| 2002/0170059 A1 | 11/2002 | Hoang | |
| 2002/0171691 A1 | 11/2002 | Currans et al. | |
| 2002/0184629 A1 | 12/2002 | Sie et al. | |
| 2002/0188944 A1 | 12/2002 | Noble | |
| 2002/0196268 A1 * | 12/2002 | Wolff et al. | 345/718 |
| 2002/0199190 A1 | 12/2002 | Su | |
| 2003/0001880 A1 | 1/2003 | Holtz et al. | |
| 2003/0014752 A1 | 1/2003 | Zaslavsky et al. | |
| 2003/0014753 A1 | 1/2003 | Beach et al. | |
| 2003/0023970 A1 | 1/2003 | Panabaker | |
| 2003/0025832 A1 | 2/2003 | Swart et al. | |
| 2003/0028873 A1 | 2/2003 | Lemmons | |
| 2003/0041104 A1 | 2/2003 | Wingard et al. | |
| 2003/0051246 A1 | 3/2003 | Wilder et al. | |
| 2003/0056216 A1 * | 3/2003 | Wugofski et al. | 725/46 |
| 2003/0056218 A1 | 3/2003 | Wingard et al. | |
| 2003/0066081 A1 | 4/2003 | Barone, Jr. et al. | |
| 2003/0067554 A1 | 4/2003 | Klarfeld et al. | |
| 2003/0070170 A1 | 4/2003 | Lennon | |
| 2003/0084444 A1 | 5/2003 | Ullman et al. | |
| 2003/0084449 A1 | 5/2003 | Chane et al. | |
| 2003/0086694 A1 * | 5/2003 | Davidsson | 386/83 |
| 2003/0093790 A1 | 5/2003 | Logan et al. | |
| 2003/0093792 A1 | 5/2003 | Labeeb et al. | |
| 2003/0097657 A1 | 5/2003 | Zhou et al. | |
| 2003/0110503 A1 | 6/2003 | Perkes | |
| 2003/0126601 A1 * | 7/2003 | Roberts et al. | 725/37 |
| 2003/0132971 A1 * | 7/2003 | Billmaier et al. | 345/810 |
| 2003/0135464 A1 | 7/2003 | Mourad et al. | |
| 2003/0140097 A1 | 7/2003 | Schloer | |
| 2003/0151621 A1 | 8/2003 | McEvilly et al. | |
| 2003/0172370 A1 | 9/2003 | Satuloori et al. | |
| 2003/0189668 A1 | 10/2003 | Newnam et al. | |
| 2003/0204846 A1 * | 10/2003 | Breen et al. | 725/39 |
| 2003/0204854 A1 | 10/2003 | Blackketter et al. | |
| 2003/0229899 A1 | 12/2003 | Thompson et al. | |
| 2004/0003402 A1 | 1/2004 | McKenna, Jr. | |
| 2004/0019900 A1 | 1/2004 | Knightbridge et al. | |
| 2004/0031015 A1 | 2/2004 | Ben-Romdhane et al. | |
| 2004/0039754 A1 | 2/2004 | Harple, Jr. | |
| 2004/0078814 A1 | 4/2004 | Allen | |
| 2004/0107437 A1 | 6/2004 | Reichardt et al. | |
| 2004/0133923 A1 | 7/2004 | Watson et al. | |
| 2004/0136698 A1 | 7/2004 | Mock | |
| 2004/0172648 A1 * | 9/2004 | Xu et al. | 725/38 |
| 2004/0194136 A1 | 9/2004 | Finseth et al. | |
| 2004/0221306 A1 * | 11/2004 | Noh | 725/44 |
| 2004/0226051 A1 | 11/2004 | Carney et al. | |
| 2005/0005288 A1 | 1/2005 | Novak | |

| | | | |
|---|---|---|---|
| 2005/0086172 | A1 | 4/2005 | Stefik |
| 2005/0149972 | A1 | 7/2005 | Knudson |
| 2005/0155063 | A1 | 7/2005 | Bayrakeri et al. |
| 2005/0283800 | A1 | 12/2005 | Ellis et al. |
| 2005/0287948 | A1 | 12/2005 | Hellwagner et al. |
| 2006/0080707 | A1 | 4/2006 | Laksono |
| 2006/0248572 | A1 | 11/2006 | Kitsukama et al. |
| 2007/0271587 | A1 | 11/2007 | Rowe |
| 2008/0060011 | A1 | 3/2008 | Kelts |
| 2008/0189740 | A1 | 8/2008 | Carpenter et al. |
| 2008/0196070 | A1 | 8/2008 | White et al. |
| 2008/0235725 | A1 | 9/2008 | Hendricks et al. |
| 2008/0276278 | A1 | 11/2008 | Krieger et al. |
| 2009/0019485 | A1 | 1/2009 | Ellis et al. |
| 2009/0094632 | A1 | 4/2009 | Newnam et al. |
| 2010/0223640 | A1 | 9/2010 | Reichardt et al. |
| 2010/0251284 | A1 | 9/2010 | Ellis et al. |
| 2011/0209180 | A1 | 8/2011 | Ellis et al. |

FOREIGN PATENT DOCUMENTS

| | | | |
|---|---|---|---|
| EP | 0963115 | | 12/1999 |
| EP | 1080582 | | 3/2001 |
| EP | 1058999 | | 4/2003 |
| GB | 2323489 | A * | 9/1998 |
| WO | 99/63757 | | 12/1999 |
| WO | 0011869 | | 3/2000 |
| WO | 00/33576 | | 6/2000 |
| WO | 0182613 | | 11/2001 |
| WO | 02063426 | | 8/2002 |
| WO | 02063471 | | 8/2002 |
| WO | 02063851 | | 8/2002 |
| WO | 02063878 | | 8/2002 |
| WO | 03/009126 | | 1/2003 |

OTHER PUBLICATIONS

Fernando Pereira; Rouradj Ebrahimi, The MPEG-4 Book, Jul. 10, 2002, Prentice Hall, Section 2.5, 7.4, 7.5.

Michael Adams, OpenCable Architecture, Dec. 3, 1999, Cisco Press, Chapter 15.

Mark Riehl; Ilya Sterin, XML and Peri, Oct. 16, 2002, Sams, Chapter 1.

Andreas Kraft and Klaus Hofrichter, "An Approach for Script-Based Broadcast Application Production," Springer-Verlag Brling Heidelberg, pp. 74-82, 1999.

Meta TV, Inc., PCT/US02/29917 filed Sep. 19, 2002, International Search Report dated Apr. 14, 2003; ISA/US; 6pp.

Office Action dated Jan. 25, 2011 from U.S. Appl. No. 10/618,210.

Andreas Kraft and Klaus Hofrichter, "An Approach for Script-Based Broadcast Application Production", Springer-Verlag Brling Heidelberg, pp. 74-82, 1999.

Shim, et al., "A SMIL Based Graphical Interface for Interactive TV", Internet Tech. Laboratory Dept. of Comp. Engineering, San Jose State University, pp. 257-266.

Yoon, et al., "Video Gadget: MPET-7 Based Audio-Visual Content Indexing and Browsing Engine", LG Electronics Institute of Technology, pp. 59-68.

Fernando Periera, "The MPEG-4 Book", Prentice Hall, Jul. 10, 2002.

Michael Adams, "Open Cable Architecture", Cisco Press, Dec. 3, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

U.S. Appl. No. 10/618,210, Programming Contextual Interactive Used Interface for Television, filed Jul. 11, 2003.

U.S. Appl. No. 10/672,983, System and method for controlling iTV application behaviors through the use of application profile filters, filed Sep. 25, 2003.

U.S. Appl. No. 10/247,901, Interactive user interface for television applications, filed Sep. 19, 2002.

U.S. Appl. No. 10/306,752, Broadcast database, filed Nov. 27, 2002.

U.S. Appl. No. 10/630,815, System and method for construction, delivery and display of iTV content, filed Jul. 29, 2003.

U.S. Appl. No. 10/933,845, System and Method for Preferred Placement Programming of iTV Content, filed Sep. 2, 2004.

U.S. Appl. No. 10/635,799, User customization of user interfaces for interactive television, filed Aug. 5, 2003.

U.S. Appl. No. 10/925,737, Contextual navigational control for digital television, filed Aug. 24, 2004.

U.S. Appl. No. 12/877,492, Verification of Semantic Constraints in Multimedia Data and in its Announcement, Signaling and Interchange, filed Sep. 8, 2010.

U.S. Appl. No. 13/049,948, System and Method for Construction, Delivery and Display of iTV Applications that Blend Programming Information of On-Demand and Broadcast Service Offerings, filed Mar. 17, 2011.

U.S. Appl. No. 13/161,879, System and Method for Construction, Delivery and Display of iTV Content, filed Jun. 16, 2011.

* cited by examiner

CHANNEL FAMILY SURF CONTROL

RELATED APPLICATIONS

The present application hereby incorporates by reference and claims the priority benefit of U.S. Provisional Patent Application 60/488,560, filed Jul. 18, 2003, and is also a Continuation-in-Part of and incorporates by reference U.S. Provisional Patent Application No. 60/486,568, entitled System and Method for Controlling iTV Application Behaviors Through the Use of Application Profile Filters, filed Jul. 11, 2003 and U.S. patent application Ser. No. 10/672,983 entitled System and Method for Controlling iTV Application Behaviors Through the Use of Application Profile Filters, filed Sep. 25, 2003.

FIELD OF THE INVENTION

The present invention relates to systems and methods for presenting navigation options and controls for television services.

BACKGROUND

Interactive television (iTV) is currently available in varying forms. At the core of iTV applications are the navigation applications provided to subscribers to assist in the discovery and selection of television programming. Current methods for browsing and selecting broadcast (linear) television programming involve the use of interactive program guides (IPGs)—also known as electronic program guides (EPGs). Current IPGs allow subscribers to browse and select broadcast programming and also provide for the ability to subset the broadcast program listings by subject or type of programming.

In addition to broadcast television, subscribers may now also be given opportunities to select from a list of programs that are not linear, but instead are provided on demand. Such content is generally referred to as Video on Demand (VOD). Current systems for browsing and selecting VOD programs include the ability to select such programming from categories of programs.

With the aid of advancing technologies, such as video compression, cable and satellite television system operators are able to send more and more broadcast channels over their systems. This, in turn, has prompted broadcast content providers to develop more channel offerings. Thus one content provider, or content provider holding company, may have multiple channel offerings. These offerings are often marketed or grouped under a single channel family brand, but each individual channel within the group usually provides different content at different times. An example of such a channel family is the Discovery Channel™ network, which began as a single channel and then added additional channels such as Discovery Wings™, Discovery Health™, and Discovery Science™.

Because channels of a family are often added to cable and satellite system line-ups over time and often have different carriage agreements, they usually have non-sequential channel numbers within a cable or satellite television service. Even where the channels are grouped as sequential access numbers, one must still first find the start of the channel family in a potentially large line up of channels. The result is that one cannot easily surf through the broadcast offerings for a given channel family provider.

Current technology for surfing television channels includes the ability to surf (navigate) up and down through channel numbers, generally through up and down arrow keys (or "+/−" keys) on a remote control and also allows for keying in a specific channel numbers and then advancing directly to that channel. The channel surfing up and down through channels may be filtered by genre, so as to enable surfing through content of specific genres: e.g., only movie content or only sports content. The channel surfing may also be restricted by what the television viewer has determined as their favorite channels. In that instance the surfing will only navigate through channels that have been pre-selected by the viewer.

SUMMARY OF THE INVENTION

In one embodiment, an interface for an interactive television application includes a graphical representation of a channel changing apparatus and the interface is configured such that in response to a channel change request a channel change event limited to a channel change within a designated family of television channels is initiated. The graphical element may be labeled so as to indicate the presently viewed family of television channels. In various embodiment, the channel content may be scaled to fit within a window or may be full screen, in which latter case the interface may be overlaid on top of the full screen video. In one example, the graphical representation of the channel changing apparatus resembles a pair of channel up/down buttons.

BRIEF DESCRIPTION OF THE DRAWINGS

The present invention is illustrated by way of example, and not limitation, in the figures of the accompanying drawings, in which.

DETAILED DESCRIPTION

Figure 1:
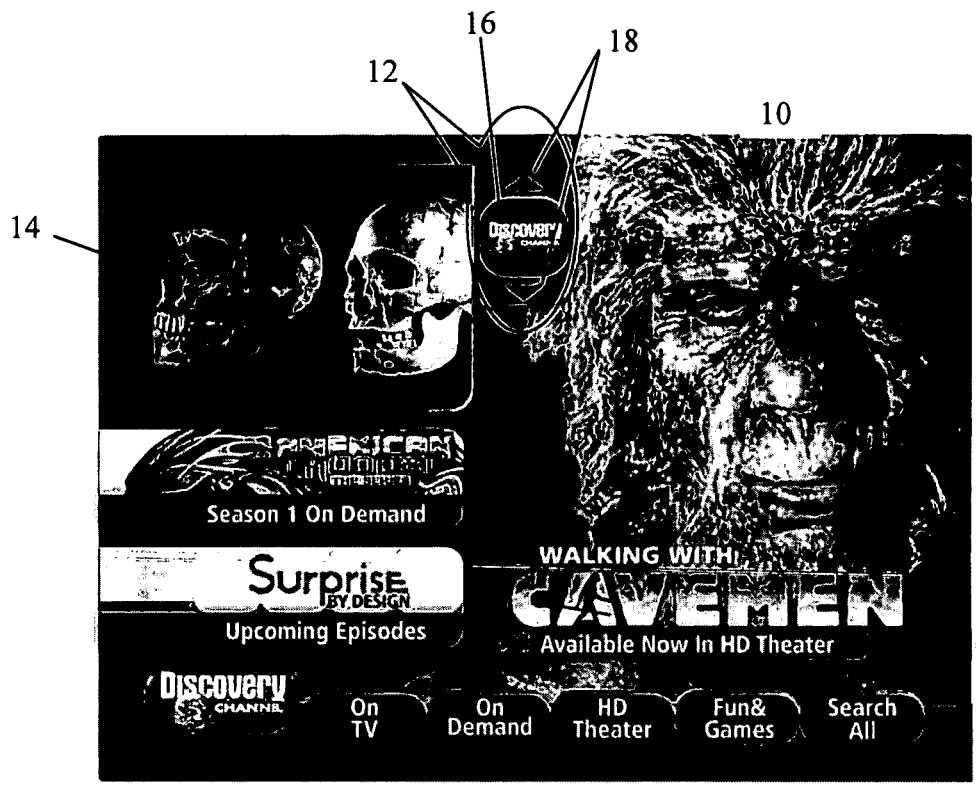
FIGS. 1 and 2 illustrate examples of channel home pages for use with a Channel Family Surf Control configured in accordance with embodiments of the present invention.

Described herein are interfaces and methods by which television viewers are presented with means for navigating a set of television channels (which may be linear, non-linear or both) that belong to a channel family, or share some other affinity. As discussed further below, the present invention may be implemented in several different ways. Two examples of such implementations are: (i) a Channel Family Surf Control using a scaled video window with an iTV application sharing the screen with the video; and (2) a Channel Family Surf Control using a full-screen broadcast with an iTV application overlaying the video.

In the following description, for purposes of explanation, some specific details are set forth in order to provide a thorough understanding of the present television navigation controls. It will be evident, however, to one skilled in the art that the present invention may be practiced without these specific details. In some instances, well-known structures and devices are not shown or described in detail, in order to avoid obscuring the present invention. For example, it is presumed that the reader is familiar with iTV applications in general and so the detailed nature of these applications and the manner of their creation and delivery will not be discussed herein. Readers not familiar with such specifics may refer to the above-cited U.S. patent application Ser. No. 10/672,983, incorporated herein by reference and also to U.S. patent application Ser. No. 10/390,064, also incorporated herein by reference. These co-pending patent applications provide numerous details regarding the creation and deployment of iTV applications.

Notwithstanding the above, the embodiments of the present invention that are described herein are presented with sufficient detail so as to allow those of ordinary skill in the art to practice the invention, and it is to be understood that other embodiments may be utilized and that logical, mechanical, electrical, and other changes may be made without departing from the scope of the present invention. Some portions of the detailed descriptions that follow are presented in terms of functional operations of a computer system (e.g., as deployed in the form of a set-top box). These descriptions are generally understood as the means used by those skilled in the data processing arts to most effectively convey the substance of their work to others skilled in the art. It should be appreciated that these functional descriptions concern various computer algorithms, which are generally understood to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, signals, datum, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes (e.g., as is the case with a set-top box implementation), or it may comprise a general-purpose computer, selectively activated or reconfigured by a computer program stored therein. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs configured in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. Those who practice in the field will immediately appreciate that the invention can be implemented with computer system configurations other than those described below, including set-top boxes, hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required configuration for such systems will be apparent from the description below.

The methods of the invention may be implemented using computer software. If written in a programming language conforming to a recognized standard, sequences of instructions designed to implement the methods can be compiled for execution on a variety of hardware platforms and for interface to a variety of operating systems. The present invention is not described with reference to any particular programming language as it should be appreciated that a variety of programming languages may be used to implement the teachings of the invention as described herein. Furthermore, it is common in the art to speak of software, in one form or another (e.g., program, procedure, application, etc.), as taking an action or causing a result. Such expressions are merely a shorthand way of saying that execution of the software by a computer causes the processor of the computer to perform an action or produce a result.

The term Channel Family Surf Control is used herein to describe a mechanism for controlling navigation between multiple channels that belong to a single channel family, or a set of channels that form a single brand or business association, or other affinity, such as by way of example a channel holding company or niche focus such as all women's channels or all channels currently showing a football game. The present invention differs, in part, from current channel navigation schemes in that the present invention provides for surfing through a family of related channels. This may be independent of genre, or may all be of a like genre where the channel family represents only a subset of that genre. The channel relationships may be configured by: a network operator, a content owner or distributor, and/or an end user.

An example of this concept (which in no way should be read as limiting the broader notion of a channel family as discussed above) is the HBO™ family of channels. Within a given cable or satellite television system, HBO television services may span multiple channels and all of those channels may, at any given time, be carrying different movies or other content. Creating a surf navigation filter for the HBO channel family in accordance with the present invention will provide a unique navigation tool that will allow a user to browse through all HBO channel content, but only that content. This is particularly valuable if the television viewer is only subscribed to HBO services (and not, for example, other movie channel service providers) and wants to get a quick view of the content offered through the HBO provider. Another example of an affinity which may define a channel family is an iTV application centered on football, where the Channel Family Surf Control provides for navigation through all of the football games currently being broadcast, or the subset of those games for which the viewer has access rights.

The Channel Family Surf Control also provides a unique control for the benefit of the channel family provider. With current state of the art digital set-top box technology, one may create interactive applications (iTV applications) for use by the television viewer. One such implementation of an iTV application in accordance with the present invention is the notion of a home page for channel families. Examples of such a home page for use with the Channel Family Surf Control are illustrated in FIGS. 1 and 2.

Figure 2:
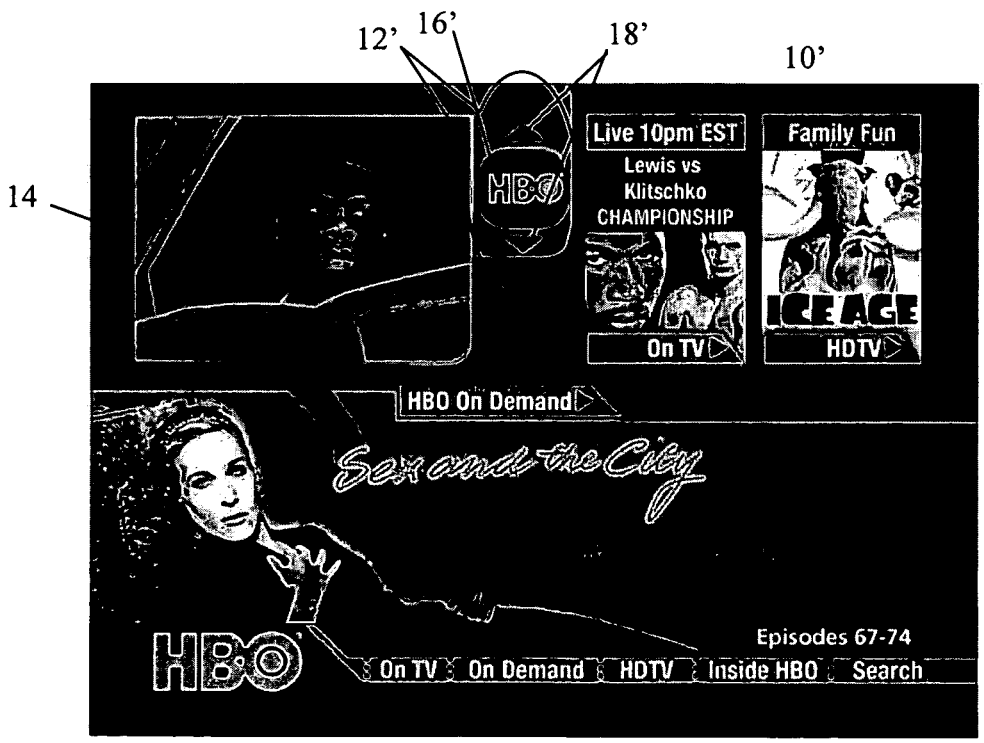

In each of these examples the viewer is provided with a home page 10 and 10' for a particular content provider (Discovery in FIG. 1 and HBO in FIG. 2). Within a channel family home page the Channel Family Surf Control 12 and 12' is displayed to assist the viewer in surfing through the channels that belong to the specific provider. In the illustrated examples, a small viewing window 14 and 14' in which the channel content is displayed as the viewer surfs through the channels is provided. In other embodiments the Channel Family Surf Control may be provided as an on-screen overlay where the channel content is presented in the background in full-screen mode.

The Channel Family Surf Control is displayed on the television screen and within the home pages 10 and 10' as a graphical representation of a conventional set of channel change buttons separated by a center button. Center button 16 and 16' may be branded so as to reflect the channel family being surfed. This serves as a reminder to the user of the content being browsed. The up/down channel button pairs 18 and 18' may be icons within the iTV application that can be selected by the user using a conventional television remote control. Alternatively, these graphical elements may represent the functionality now assigned to various buttons of a conventional remote control, such as channel up/down buttons, such that operation of these buttons will activate the associated feature (e.g., a channel change operation) within the iTV application. The remaining elements of the home pages 10 and 10' are not critical to the present invention and are provided merely for illustration purposes. As shown in the figures, various forms of content may be provided, including advertisements, etc. Also, buttons or other selectable elements that allow viewers to access other features of the iTV applications may be provided.

Figure 3:
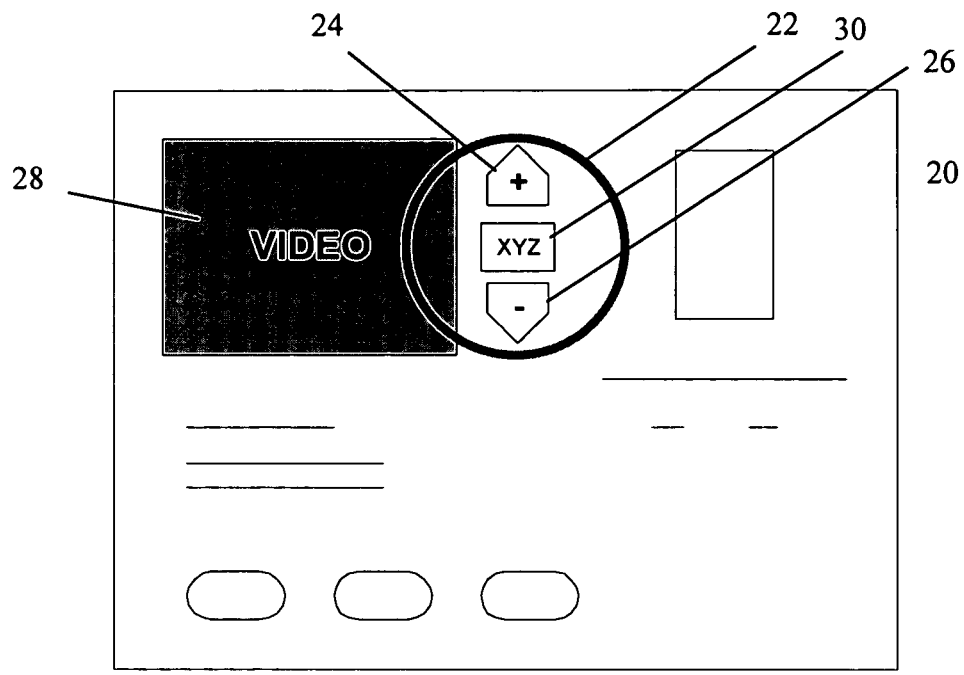
FIGS. 3 and 4 illustrate embodiments for delivering a Channel Family Surf Control in a mode with scaled video according to aspects of the present invention.
Figure 4:
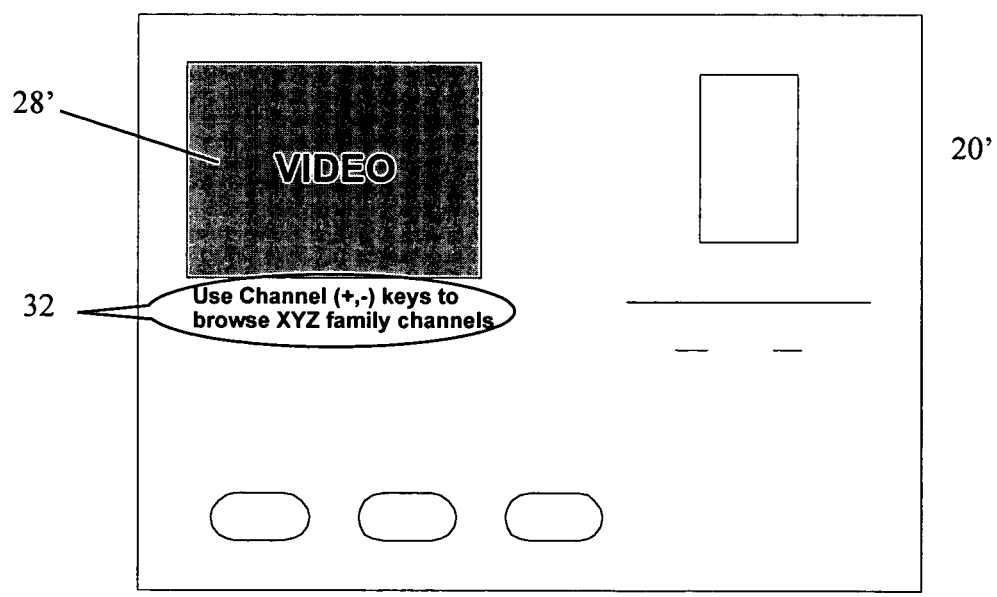

FIGS. 3 and 4 illustrate embodiments for delivering the Channel Family Surf Control in a mode with scaled video. In FIG. 3 an on-screen display 20 is shown. Within on-screen display 20, the Channel Family Surf Control functionality is provided via a channel selection interface 22. Within this interface, the viewer is given on-screen up and down arrow buttons 24 and 26, respectively, that, when clicked (e.g., using appropriate remote control or set-top box selection mechanisms), will shift the broadcast video shown in the scaled video window 28 to different broadcast channels within the given broadcast family. Here the channel affinity is given by the "XYZ" label which is displayed within a channel family identifier 30, associated with the channel selection interface 22. One embodiment of this solution will allow for navigation through the channels to be looped such that when the viewer reaches the highest channel number for the given family, then the next channel up request will loop the video window back to the lowest channel number for that given family. Other elements of the on-screen display 20 are not critical to the present invention and are provided for illustration purposes only.

Figure 5:
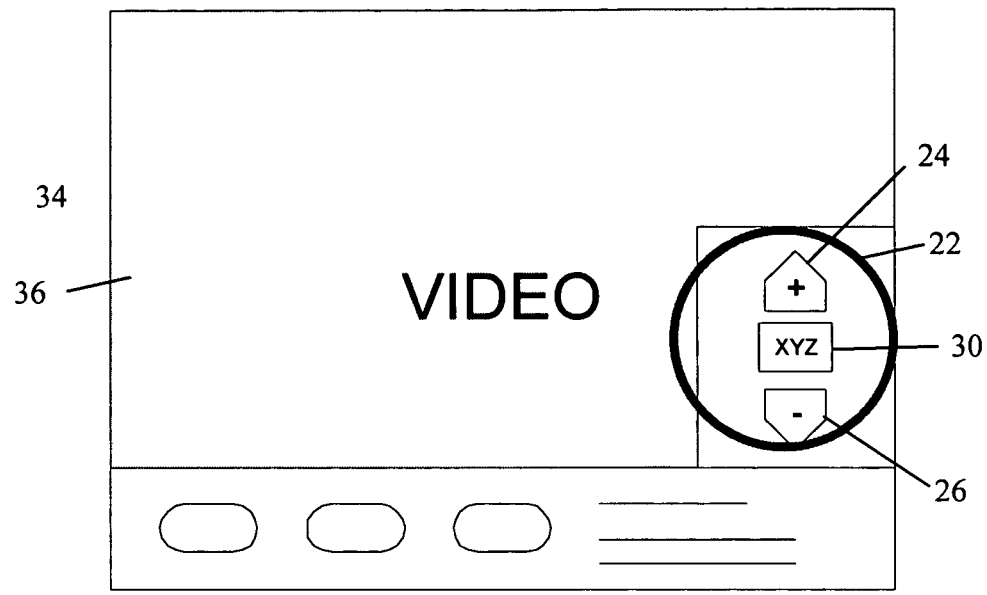
FIGS. 5, 6 and 7 illustrate embodiments for delivering a Channel Family Surf Control in a mode where an iTV application is an overlay on top of full-screen video according to aspects of the present invention.
Figure 6:
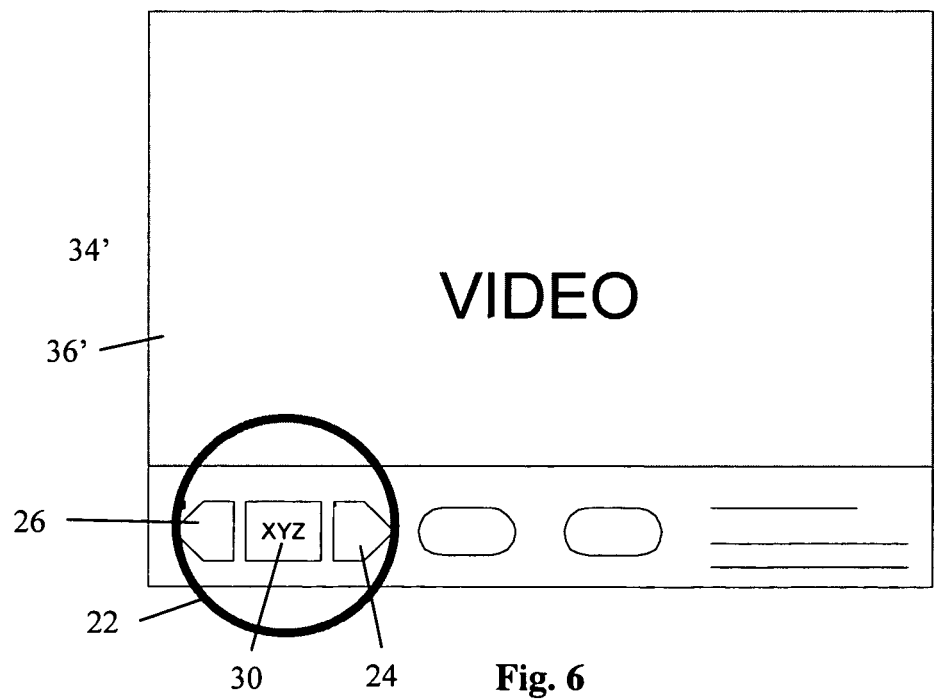
Figure 7:
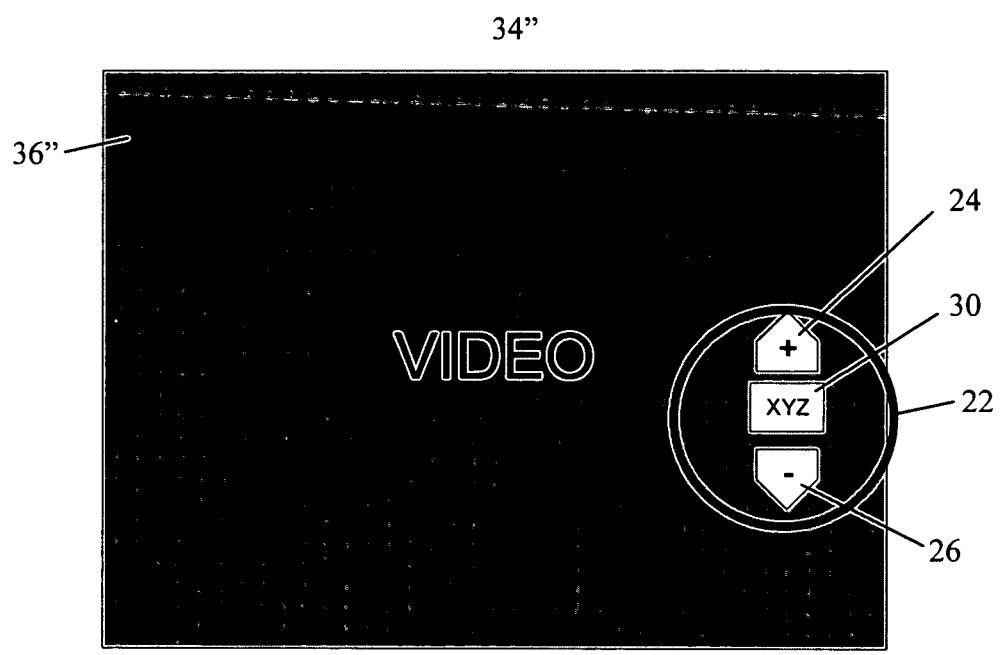

In the example of an on-screen display 20' shown in FIG. 4, the viewer is given no specific on-screen buttons but is instead advised via text 32 to use the channel buttons on the set-top box or television remote control to surf through the channel family broadcast channels. In one embodiment of this implementation, the viewer will understand the channel family context from the surrounding iTV application content and/or branding. This is further illustrated in FIG. 2 where the HBO branding in the widget control is not necessarily required since the HBO branding is found below in the general iTV application. As was the case for the previous example, a scaled video window 28' is available for the viewer to preview the content offered at the channel being browsed FIGS. 5, 6 and 7 illustrate examples of on-screen displays 34, 34' and 34", respectively, for delivering the Channel Family Surf Control in a mode where the iTV application is an overlay on top of full-screen video 36, 36' and 36". In such embodiments, when the viewer navigates through the channel family broadcast channels, the iTV application will stay present but the background video will switch to that of the selected channel in the channel family. As shown, the Channel Family Surf Control 22 may be overlaid to the side of the video in a separate window (FIG. 5), at the edge of the screen in the iTV application window (FIG. 6), or directly over the video (FIG. 7). Of course, other display configurations are also possible.

When a viewer uses the Channel Family Surf Control, the navigation clicks (i.e., channel change requests) may be delivered using the on-screen buttons or television/set-top box remote control and the corresponding channel change requests may be captured by the iTV application in the conventional fashion. The iTV application is, in accordance with the present invention, provided with a list of channel identifiers that describe the relationship of individual channels to channel families. Such a list may be configured by a network operator, a content owner or distributor, and/or a viewer. Depending on the implementation, a single channel may belong to more than one channel family. For example, an HBO channel may belong to the family of HBO channels and also to a family of movie channels, etc. Upon receipt of a navigation request, the iTV application determines if an up or down channel request was made (i.e., determines the direction to tune to the next channel in the selected family) and then selects the next or previous channel in the channel list as appropriate. The iTV application then calls a set-top box function to cause the tuner to tune to the specific channel retrieved from the list. Such tuning operations are conventional in nature with the exception that the Channel Family Surf Control list is used to provide the information regarding the next channel to tune to.

Thus, systems and methods to control and facilitate surfing among related channels of a channel family have been described. It should be noted that the iTV applications and on-screen displays described above may be implemented using conventional iTV application methods and systems. The present Channel Family Surf Control, however, has not previously been a part of such methods or systems. Therefore, even though discussed with reference to certain illustrated examples, the present invention should not be limited thereby and should only be measured in terms of the claims, which follow.

What is claimed is:

1. A non-transitory computer readable storage medium storing computer executable instructions that, when executed, cause a processor to:

process channel identifiers that indicate a branding relationship between individual ones of a plurality of channels and a plurality of channel families, each channel family of the plurality of channel families comprising a subset of the plurality of channels and corresponding to content provided by a respective one of a plurality of branded content creators;

in response to receiving a selection of a first channel family of the plurality of channel families, generate a graphical user interface configured to display video of a first channel in the subset of the first channel family and, while displaying the video, display advertisement content that identifies a first branded content creator of the plurality of branded content creators, wherein the first channel family corresponds to content provided by the first branded content creator; and in response to each received channel change request after selection of the first channel family, display video of a different channel in the subset of the first channel family within the graphical user interface while continuing to display the advertisement content that identifies the first branded content creator.

2. The non-transitory computer readable storage medium of claim 1, wherein the computer executable instructions, when executed, cause the processor to present a label for a graphical element indicating the first channel family has been selected.

3. The non-transitory computer readable storage medium of claim 1, wherein the graphical user interface has a window for displaying video of a selected channel in the subset of the first channel family scaled to fit within the window, and wherein the advertisement content that identifies the first branded content creator surrounds the window.

4. The non-transitory computer readable storage medium of claim 1, wherein the computer executable instructions, when executed, cause the processor to cause presentation of an overlay on top of full screen video.

5. The non-transitory computer readable storage medium of claim 1, wherein the computer executable instructions, when executed, cause the processor to cause presentation of a pair of channel up/down buttons.

6. A method comprising:
processing, by a computer, channel identifiers that indicate a branding relationship between individual ones of a plurality of channels and a plurality of channel families, each channel family of the plurality of channel families comprising a subset of the plurality of channels and corresponding to content provided by a respective one of a plurality of branded content creators;

in response to receiving a selection of a first channel family of the plurality of channel families, generating a graphical user interface configured to display video of a first channel in the subset of the first channel family and, while displaying the video, display advertisement content that identifies a first branded content creator of the plurality of branded content creators, wherein the first channel family corresponds to content provided by the first branded content creator; and in response to each received channel change request after selection of the first channel family, display video of a different channel in the subset of the first channel family within the graphical user interface while continuing to display the advertisement content that identifies the first branded content creator.

7. The method of claim 6, further comprising causing presentation of a pair of channel up/down buttons.

8. The method of claim 6, wherein the graphical user interface has a window for displaying video of a selected channel in the subset of the first channel family that is scaled to fit within the window, and wherein the advertisement content that identifies the first branded content creator surrounds the window.

9. The method of claim 6, further comprising causing presentation of a label indicating the first channel family has been selected.

10. The method of claim 6, further comprising causing presentation of an overlay on top of full screen video.

11. The method of claim 6, further comprising:
receiving a selection of a second channel family of the plurality of channel families, wherein the second channel family corresponds to content provided by a second branded content creator; and responsive to receiving the selection of the second channel family, updating the graphical user interface to display video of a channel in the subset of the second channel family and updating the graphical user interface to display advertisement content that identifies the second branded content creator.

12. The non-transitory computer readable storage medium of claim 1, wherein the computer executable instructions, when executed, cause the processor to:
receive a selection of a second channel family of the plurality of channel families, wherein the second channel family corresponds to content provided by a second branded content creator; and responsive to receiving the selection of the second channel family, update the graphical user interface to display video of a channel in the subset of the second channel family and update the graphical user interface to display advertisement content that identifies the second branded content creator.

13. An apparatus comprising:
a processor; and
a memory storing computer executable instructions that, when executed, cause the apparatus to:
process channel identifiers that indicate a branding relationship between individual ones of a plurality of channels and a plurality of channel families, each channel family of the plurality of channel families comprising a subset of the plurality of channels and corresponding to content provided by a respective one of a plurality of branded content creators;

in response to receiving a selection of a first channel family of the plurality of channel families, generate a graphical user interface configured to display video of a first channel in the subset of the first channel family and, while displaying the video, display advertisement content that identifies a first branded content creator of the plurality of branded content creators, wherein the first channel family corresponds to content provided by the first branded content creator; and in response to each received channel change request after selection of the first channel family, display video of a different channel in the subset of the first channel family within the graphical user interface while continuing to display the advertisement content that identifies the first branded content creator.

14. The apparatus of claim 13, wherein the computer executable instructions, when executed, cause the apparatus to cause presentation of a label for a graphical element indicating the first channel family has been selected.

15. The apparatus of claim 13, wherein the graphical user interface has a window for displaying video of a selected channel in the subset of the first channel family that is scaled to fit within the window, and wherein the advertisement content that identifies the first branded content creator surrounds the window.

16. The apparatus of claim 13, wherein the computer executable instructions, when executed, cause the apparatus to cause presentation of an overlay on top of full screen video.

17. The apparatus of claim 13, wherein the computer executable instructions, when executed, cause the apparatus to cause presentation of a pair of channel up/down buttons.

18. The apparatus of claim 13, wherein the computer executable instructions, when executed, cause the apparatus to:

receive a selection of a second channel family of the plurality of channel families, wherein the second channel family corresponds to content provided by a second branded content creator; and responsive to receiving the selection of the second channel family, update the graphical user interface to display video of a channel in the subset of the second channel family and update the graphical user interface to display advertisement content that identifies the second branded content creator.

19. The non-transitory computer readable storage medium of claim 1, wherein the computer executable instructions, when executed, cause the processor to:

receive a second channel change request;

in response to determining that the first channel family has been selected and in response to the second channel change request, limit channel change to only the subset of the first channel family and present the first channel within the graphical user interface; and in response to determining that a channel family has not been selected and in response to the second channel change request, present a new channel different than the first channel without display of the graphical user interface.

20. The method of claim 6, further comprising:

receiving a second channel change request;

in response to determining that the first channel family has been selected and in response to the second channel change request, limiting channel change to only the subset of the first channel family and presenting the first channel within the graphical user interface; and in response to determining that a channel family has not been selected and in response to the second channel change request, presenting a new channel different than the first channel without display of the graphical user interface.

21. The apparatus of claim 13, wherein the computer executable instructions, when executed, cause the apparatus to:

receive a second channel change request;

in response to determining that the first channel family has been selected and in response to the second channel change request, limit channel change to only the subset of the first channel family and the first channel within the graphical user interface; and in response to determining that a channel family has not been selected and in response to the second channel change request, present a new channel different than the first channel without display of the graphical user interface.

\* \* \* \* \*